US008711701B2

(12) United States Patent
Ju

(10) Patent No.: US 8,711,701 B2
(45) Date of Patent: Apr. 29, 2014

(54) METHOD AND SYSTEM AND POLICY SERVER FOR GUARANTEEING DATA NOT TO BE INTERRUPTED

(75) Inventor: Kai Ju, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 175 days.

(21) Appl. No.: 13/148,417

(22) PCT Filed: Sep. 10, 2009

(86) PCT No.: PCT/CN2009/073861
§ 371 (c)(1),
(2), (4) Date: Aug. 8, 2011

(87) PCT Pub. No.: WO2010/102481
PCT Pub. Date: Sep. 16, 2010

(65) Prior Publication Data
US 2011/0310740 A1 Dec. 22, 2011

(30) Foreign Application Priority Data

Mar. 11, 2009 (CN) .......................... 2009 1 0118759

(51) Int. Cl.
H04L 12/26 (2006.01)
(52) U.S. Cl.
USPC ......................................................... 370/237
(58) Field of Classification Search
USPC .................................. 370/229, 235, 237, 331
See application file for complete search history.

(56) References Cited

U.S. PATENT DOCUMENTS

| 7,065,360 | B2 * | 6/2006 | Yahagi ........................... 455/437 |
| 2003/0165124 | A1 * | 9/2003 | Alperovich et al. .......... 370/331 |
| 2006/0291419 | A1 * | 12/2006 | McConnell et al. .......... 370/331 |
| 2007/0171867 | A1 * | 7/2007 | Kim ............................... 370/331 |
| 2008/0008127 | A1 * | 1/2008 | Choi et al. .................... 370/331 |
| 2008/0159232 | A1 * | 7/2008 | Thalanany et al. ........... 370/332 |
| 2009/0109922 | A1 * | 4/2009 | Livanos ........................ 370/331 |

FOREIGN PATENT DOCUMENTS

| CN | 101102584 A | 1/2008 |
| CN | 101119314 A | 2/2008 |
| CN | 101198128 A | 6/2008 |
| WO | WO-2008014698 A1 | 2/2008 |

OTHER PUBLICATIONS

International Preliminary Report on Patentability for International Application No. PCT/CN2009/073861, issued Sep. 13, 2011 (7 pages).
Written Opinion of the International Searching Authority for International Application No. PCT/CN2009/073861, mailed Dec. 24, 2009 (6 pages).
International Search Report for International Application No. PCT/CN2009/073861, mailed Dec. 24, 2009 (4 pages).

* cited by examiner

Primary Examiner — Warner Wong
(74) Attorney, Agent, or Firm — Clark & Elbing LLP

(57) ABSTRACT

The present invention discloses a method for guaranteeing data not to be interrupted in multi-network connection environment, which applies between a user equipment (UE) connected with multiple networks and the multiple networks, and comprises that, when one or more network connections of the UE have congestion, an IP flow of the UE is transferred to an uncongested network connection from the congested network connection(s). The present invention also discloses a system and a policy server for guaranteeing data not to be interrupted. In the case that multiple network connections are established simultaneously, the present invention guarantees that data is not interrupted and achieves the effects of enlarging bandwidth and optimizing bandwidth by transferring IP flow.

18 Claims, 3 Drawing Sheets

METHOD AND SYSTEM AND POLICY SERVER FOR GUARANTEEING DATA NOT TO BE INTERRUPTED

CROSS-REFERENCE TO RELATED APPLICATIONS

This application is the U.S. National Stage filing under 35 U.S.C. §371 of International Application No. PCT/CN2009/073861, filed Sep. 10, 2009, which claims benefit of Chinese Patent Application No. 200910118759.9, filed Mar. 11, 2009.

FIELD OF THE INVENTION

The present invention relates to mobile communications technology, and especially relates to a method and a system and a policy server for guaranteeing data not to be interrupted.

BACKGROUND OF THE INVENTION

In the future mobile internet age, network environment will be very complex, wherein a UE (User Equipment) may probably have multiple connections with the network simultaneously, such as WiFi (Wireless Fidelity), GPRS (General Packet Radio Service), LTE (Long Term Evolution) and etc . . . In this case, as for the achievement of various multimedia services on the UE, there will be a plenty of options for network connection. Even the different IP flows of a same service will be probably located in different network connections. In this way, this may possibly appear service interruption resulting from that a certain network connection occurs congestion, while there is vacancy in bandwidth of other network connections, leading to waste of network resources.

FIG. 1 shows the situation of an IP flow connection between a certain UE and network connections in network environment of multi-connection. In this figure, each dotted line corresponds to a network connection of a type of service, wherein numbers 1 to 5 from up to bottom respectively correspond to VOIP (Voice over IP), meeting video, non-meeting video, WEB browse, FTP (File Transfer Protocol) download service, wherein the VOIP and the meeting video are established in connections defined by the 3GPP (Third Generation Partnership Projects), while the non-meeting video, the WEB browse and the FTP download are established in connections based on non-3GPP. Since downloading the FTP download service, congestion occurs in the connections based on the non-3GPP, the decline of service experience of other services established in the connections based on the non-3GPP can be directly reflected on the UE, such as the phenomenon of discontinuity occurring in the non-meeting video and etc . . .

SUMMARY OF THE INVENTION

A technical problem solved by the present invention is to solve the problem in the related art that a UE in multi-network connection environment causes service interruption due to congestion of a certain network connection. The present invention provides a method and a system and a policy server for guaranteeing data not to be interrupted in the multi-network connection environment, so as to achieve effects of enlarging and optimizing bandwidth.

In order to solve the above technical problem, the present invention provides a method for guaranteeing data not to be interrupted in multi-network connection environment, applied between a user equipment (UE) connected with multiple networks and the multiple networks, the method comprises:

when one or more network connections of the UE have congestion, an IP flow of the UE is transferred to an uncongested network connection from the congested network connection(s).

Further, the above method may further possess the following characteristics:
the one or more network connections of the UE has congestion is acquired by a policy server, when the policy server acquires that the one or more network connections of the UE has congestion, the step of transferring an IP flow of the UE to the uncongested network connection from the congested network connection(s) comprises:
the policy server initiates to the UE an IP flow transfer request to indicate the UE to transfer an IP flow of a designated service from a network connection of a source network to a network connection of a target network, wherein the source network is a congested network and the target network is a uncongested network; and
the UE transfers the IP flow of the designated service from the network connection(s) of the source network to the network connection of the target network.

Further, the above method may further possess the following characteristics:
the policy server acquires that the one or more network connections of the UE has congestion by receiving a congestion notification message of the source network.

Further, the above method may further possess the following characteristics:
the step of the policy server initiating to the UE an IP flow transfer request comprises:
the policy server inquires a preset connection policy, and selects as the designated service a service connected with the source network and required to be transferred according to the connection policy, and selects the target network, and initiates the IP flow transfer request to the UE.

Further, the above method may further possess the following characteristics:
the step of the UE transferring the IP flow of the designated service from the network connection(s) of the source network to the network connection of the target network comprises:
the UE establishes a connection of the IP flow of the designated service with the target network; and
the UE disconnects the connection of the IP flow of the designated service from the source network.

Further, the above method may further possess the following characteristics:
after the step of the UE disconnecting the connection of the IP flow of the designated service from the source network, the method further comprises:
an IP flow transfer completion notification is sent to the policy server; and the policy server records the connection state of the current IP flow of the UE.

Further, the above method may further possess the following characteristics:
when acquiring that the source network is recovered to have normal network connection, the policy server inquires the preset connection policy, and initiates to the UE an IP flow transfer request according to the connection policy to indicate the UE to transfer the IP flow of the designated service from the target network back to a network connection of the source network; and
the UE transfers the IP flow of the designated service back to the network connection of the source network.

Further, the above method may further possess the following characteristics:

the policy server acquires that the source network is recovered to have normal network connection by receiving a decongestion notification message of the source network.

In order to solve the above technical problem, the present invention also provides a system for guaranteeing data not to be interrupted in multi-network connection environment, comprising a UE connected with multiple networks, the multiple networks and a policy server, wherein the policy server is configured such that when acquiring one or more network connections of the UE has congestion, the policy server inquiries a preset connection policy, and initiates to the UE an IP flow transfer request according to the connection policy to indicate the UE to transfer an IP flow of a designated service from a network connection of a source network to a network connection of a target network; and the UE is configured to transfer the IP flow of the designated service from the network connection of the source network to the network connection of the target network, wherein the source network is a congested network and the target network is an uncongested network.

Further, the above system may further possess the following characteristics:

the policy server is further configured such that when acquiring the source network is recovered to have normal network connection, the policy server inquiries the preset connection policy, and initiates to the UE an IP flow transfer request according to the connection policy to indicate the UE to transfer the IP flow of the designated service from the target network back to a network connection of the source network; and the UE is further configured to transfer the IP flow of the designated service back to the network connection of the source network.

In order to solve the above technical problem, the present invention also provides a policy server for guaranteeing data not to be interrupted in multi-network connection environment, wherein the policy server is configured such that:

when acquiring one or more network connections of a UE has congestion, the policy server inquiries a preset connection policy, and initiates to the UE an IP flow transfer request according to the connection policy to indicate the UE to transfer an IP flow of a designated service from a network connection of a source network to a network connection of an target network; and the UE can thereby transfer the IP flow of the designated service from the network connection of the source network to the network connection of the target network, wherein the source network is a congested network and the target network is an uncongested network.

The policy server may be further configured such that when acquiring the source network is recovered to have normal network connection, the policy server inquiries the preset connection policy, and initiates to the UE an IP flow transfer request according to the connection policy to indicate the UE to transfer the IP flow of the designated service from the target network back to a network connection of the source network; and the UE can thereby transfer the IP flow of the designated service back to the network connection of the source network.

The advantageous effects of the present invention are as follows.

1. It is guaranteed that a user still can have uninterrupted data connection experience in the case that a certain network connection occurs congestion.
2. The use of the network bandwidth is optimized, and it is guaranteed that user's data service experience will not be obviously deteriorated when the network congestion occurs.
3. The different services can be timely transferred back to their original connections when the network congestion is relieved.

BRIEF DESCRIPTION OF THE ACCOMPANYING DRAWINGS

DETAILED DESCRIPTION OF THE PREFERABLE EMBODIMENTS

In the present invention, when one or more network connections of a UE occurs congestion, an IP flow of the UE is transferred from a congested network connection to an uncongested network connection.

The present invention will be described in detail in combination with the accompanying drawings and embodiments hereinafter.

Figure 2:
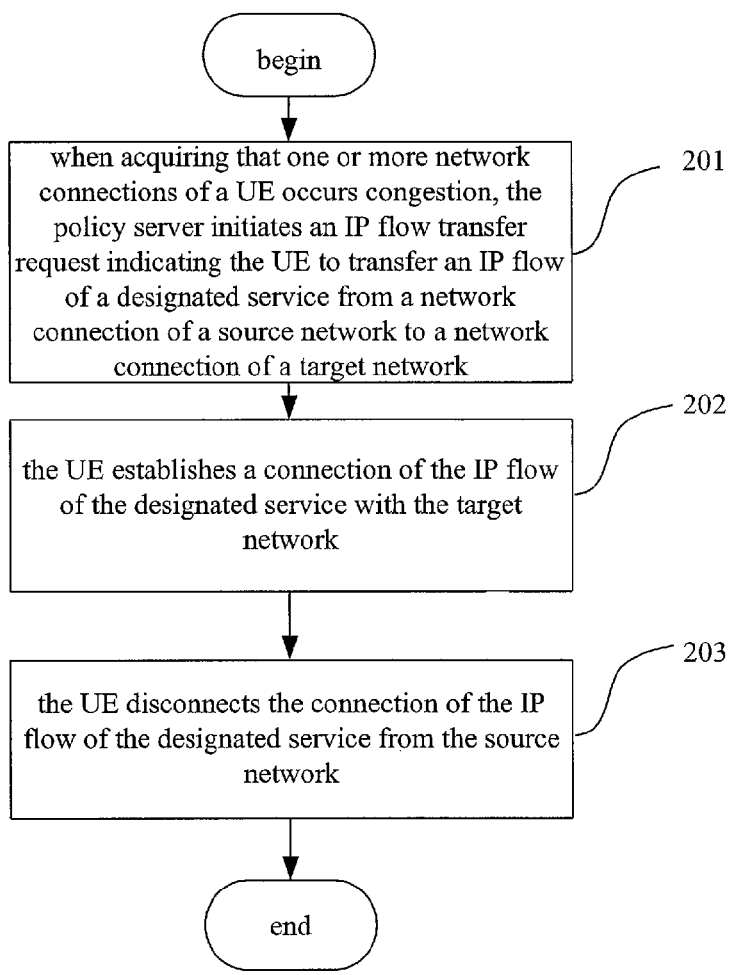
FIG. 2 is a flow chart of a method of an embodiment of the present invention.

As shown in FIG. 2, a method of an embodiment of the present invention comprises the following steps.

Step 201, when acquiring that one or more network connections of a UE occurs congestion, the policy server initiates an IP flow transfer request indicating the UE to transfer an IP flow of a designated service from a network connection of a source network to a network connection of a target network; wherein the source network is a congested network and the target network is a uncongested network.

Preferably, the policy server acquires that the one or more network connections of the UE occurs congestion by receiving a congestion notification message of the source network. A mechanism in the related art can be adopted to implement that the source network sends the congestion notification message to the policy server, which is not be described herein any more.

Preferably, the policy server inquires a preset connection policy, and selects as a designated service a service connected with the source network and required to be transferred according to the connection policy, selects the target network, and initiates an IP flow transfer request to the UE.

Preferably, different connection policies can be set depending on the specific cases of different networks and different network operators and etc . . . The connection policy can be associated with contents of network congestion state, network priority of a UE service, bandwidth occupied by services and etc . . .

Step 202, the UE establishes a connection of the IP flow of the designated service with the target network.

Specifically, preferably, Step 202 comprises:

the UE sends a service establishment request to the target network to request establishing a connection of the IP flow of a designated service; and the target network returns a service establishment success response and the service is established successfully.

Step 203, the UE disconnects the connection of the IP flow of the designated service from the source network.

Specifically, preferably, Step 203 comprises:

the UE sends a service disconnection request to the source network to request disconnecting the connection of the IP flow of the designated service; and the source network returns a service disconnection success response and the service is successfully disconnected, which represents that the IP flow is successfully transferred from the source network to the target network.

The steps 202 to 203 are the process of the UE to transfer the IP flow of the designated service from the network connection of the source network to the network connection of the target network.

Preferably, after the step 203 is implemented, the UE sends an IP flow transfer completion notification to the policy server. The policy server records connection state of the current IP flow of the UE.

Preferably, when acquiring that the source network is recovered to have normal network connection, the policy server initiates an IP flow transfer request to indicate the UE to transfer the IP flow of the designated service from the target network back to a network connection of the source network. The UE transfers the IP flow of the designated service back to a network connection of the source network according to the IP flow transfer request.

Preferably, when acquiring that the source network is recovered to have normal network connection, the policy server inquires a preset connection policy and initiates an IP flow transfer request according to the connection policy.

Preferably, the policy server acquires that the source network is recovered to have normal network connection by receiving a decongestion notification message of the source network. A mechanism in the related art can be adopted to implement that the source network sends the decongestion notification message to the policy server, which is not be described herein any more.

A system of an embodiment of the present invention comprises a UE with multiple network connects, the multiple networks and a policy server.

The policy server is configured such that, when acquiring one or more network connections of the UE occurs congestion, the policy server inquires a preset connection policy, and initiates an IP flow transfer request according to the connection policy to indicate the UE to transfer an IP flow of a designated service from a network connection of a source network to a network connection of an target network.

The UE is adapted to transfer the IP flow of the designated service from the network connection of the source network to the network connection of the target network.

In the system, the source network is a congested network and the target network is an uncongested network.

The policy server is further configured such that, when acquiring the source network is recovered to have normal network connection, the policy server inquires the preset connection policy, and initiates an IP flow transfer request according to the connection policy to indicate the UE to transfer the IP flow of the designated service from the target network back to a network connection of the source network. The UE is further adapted to transfer the IP flow of the designated service back to the network connection of the source network.

The present invention will be further described in combination with a specific application example hereinafter.

Figure 1:
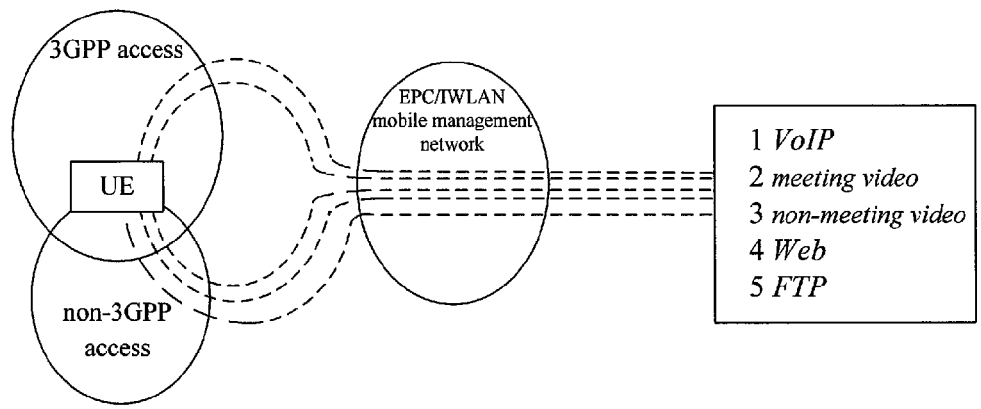
FIG. 1 is an example of multi-network connections.
Figure 3:
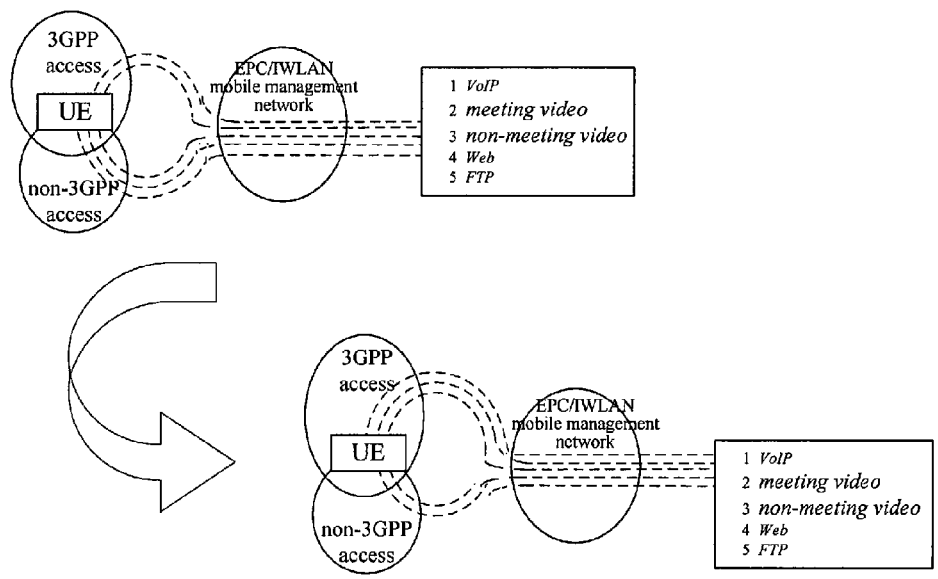
FIG. 3 is a schematic diagram of an IP flow transfer of an application example of the present invention.
Figure 4:
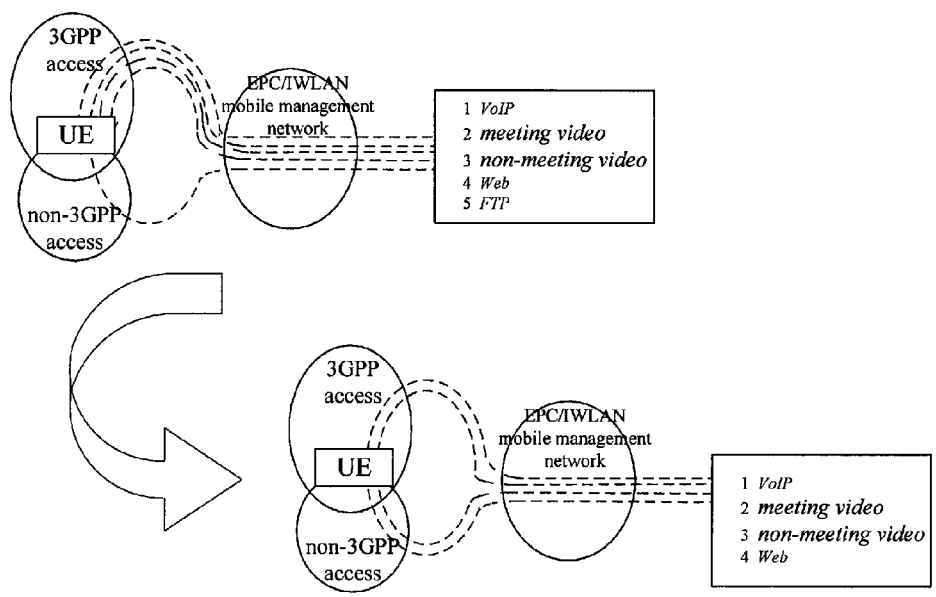
FIG. 4 is a schematic diagram of an IP flow transfer back of an application example of the present invention.

Taking FIG. 3 and FIG. 4 as examples, the upper part of the FIG. 3 is the same with FIG. 1 which shows connection state of IP flows between a UE and networks. In the figures, each dotted line corresponds to a network connection of a type of service, wherein numbers 1 to 5 from up to bottom respectively correspond to VOIP, meeting video, non-meeting video, WEB browse, FTP download service, wherein the VOIP and the meeting video are established in connections defined by the 3GPP, while the non-meeting video, the WEB browse and the FTP download are established in connections based on non-3GPP. Since downloading the FTP download service, congestion occurs in the connections based on the non-3GPP, the decline of service experience of other services established in the connections based on the non-3GPP can be directly reflected on the UE, such as the phenomenon of intermittence occurring in the non-meeting video and etc . . .

In this case, by the solution of the present invention, the networks is cooperated with the UE to transfer the IP flow of the non-meeting video to a connection of the 3GPP, so as to achieve the effect shown in the lower part of the FIG. 3. Moreover, after FTP download is completed and the network congestion is finished, the transferred IP flow can be re-transferred back to a connection of the non-3GPP which is the effect as shown in the FIG. 4.

Different connection policies are defined in the policy server according to specific cases of different networks and different network operators. Taking the services shown in the FIG. 3 and the FIG. 4 as an example, a connection policy of the "non-meeting video" service is preset in the policy server, in which the first priority network is "a WLan connection" and the second priority network is "a LTE connection". When the first priority network produces congestion, resulting in incapability of continuing the service or service experience deterioration, the policy server, after acquiring it, initiates to the UE a request of transferring the service to the second priority network by inquiring the preset connection policy.

As shown in the FIG. 3 and the FIG. 4, the process comprises the following steps. Step A, the UE is in a multi-connection network environment, wherein among services used by the UE, the VOIP and the meeting video employ reliable connection types defined by the 3GPP, such as LTE connection, while the non-meeting video, the WEB browse and the FTP download employ reliable connection types defined by non-3GPP, such as WLan (Wireless Local Area Network).

Step B, when the FTP download leads to congestion occurring a WLan connection which affects other services experience which are established in the WLan connection, the network detects to the congestion and notifies the policy server, wherein after receiving the notification, according to the preset connection policy the policy server inquires and determines that the second priority network of the non-meeting video of another service in the WLan connection is the "LTE connection", then the policy server sends a message to the UE, to request the UE to transfer the IP flow of the non-meeting video service to the LTE connection.

Step C, after receiving the notification of the policy server, the UE firstly initiates a non-meeting video service connection request in the LTE connection, and after receiving a network success response, initiates a request of disconnecting the non-meeting video service connection in the connection of the WLan; and after the network responds successfully, data of the non-meeting video service is transferred from the connection of the WLAN to the LTE connection.

Step D, after the FTP download is completed, the network detects that the connection of the WLan does not have congestion any more, and then a request of transferring the service originally established in the connection of the WLan back to a connection of the WLan is sent to the UE by the policy server.

Figure 5:
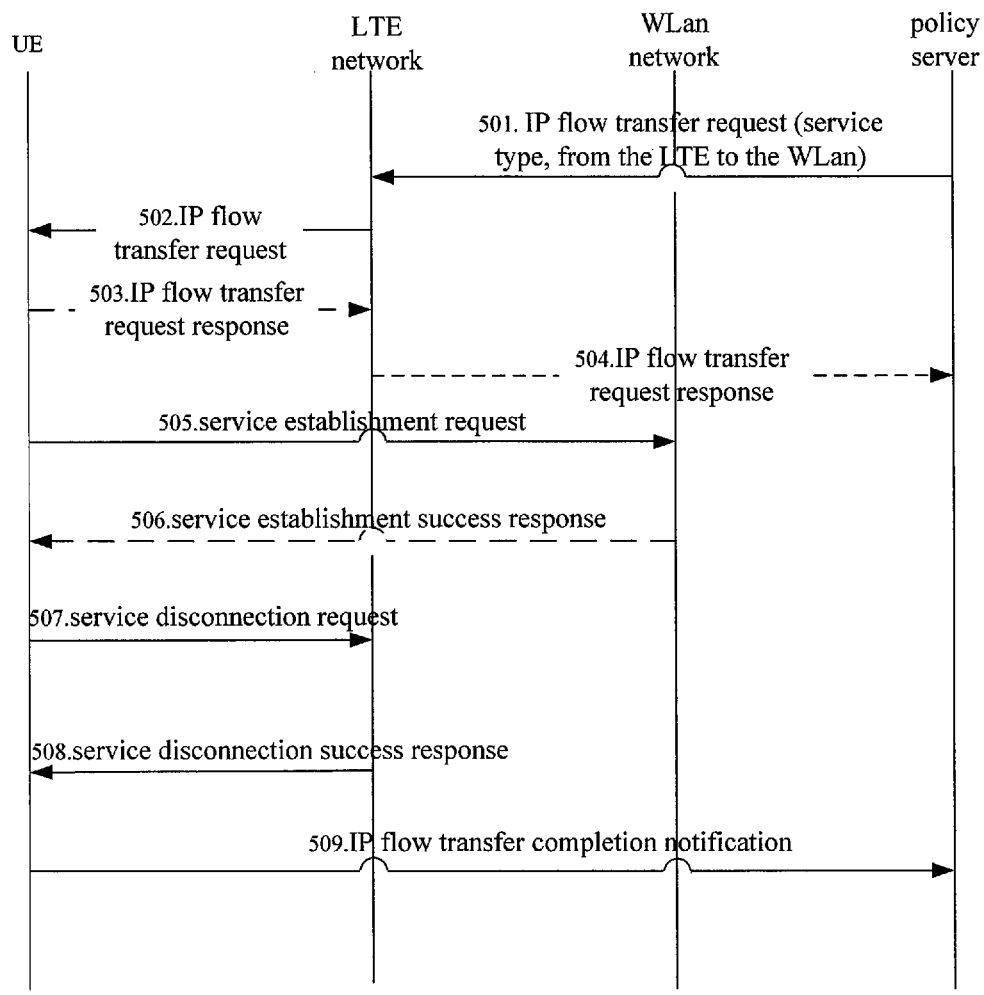
FIG. 5 is a flow chart of a process of an IP flow transfer of an application example of the present invention.

The process of IP flow transfer is further described in combination with FIG. 5 hereinafter.

Step 501, after inquiring a connection policy, the policy server sends to the UE an IP flow transfer request via the LTE network according to the inquiring result, wherein the IP flow transfer request includes the type of the service to be transferred and information of transferring from the LTE network to the WLan network.

Step 502, the LTE network forwards the IP flow transfer request to the UE.

Step 503, the UE returns an IP flow transfer request response to the policy server via the LTE network.

Step 504, the LTE network forwards the IP flow transfer request response to the policy server.

Step 505, the UE initiates a service establishment request to the WLan network, wherein the service type is the service type in the IP flow transfer request message received.

Step 506, the WLan network responds to that the service is successfully established.

Step 507, the UE initiates a service disconnection request to the LTE network, wherein the service type is the service type in the IP flow transfer request message received.

Step 508, the LTE network responds to that the service is successfully disconnected.

Step 509, the UE sends an IP flow transfer completion notification to the policy server and the policy server records connection state of the current service of the UE.

As described above, in the case that multiple network connections are established simultaneously, the present invention guarantees that data is not interrupted, and achieves the effects of enlarging bandwidth and optimizing bandwidth use by transferring IP flow or re-establishing IP flow, in which the policy server is a function entity for the UE to manage network connections. In practice, the police server can be located in a same server with other function entities, which will not be limited specifically in the present invention. Connection policies are set in the policy server. The policy server judges whether to transfer IP flow and which service has the IP flow to be transferred as well as which network which the IP flow will be transferred to, according to the connection policies and connection state of the current IP flow of the UE, wherein if it is required to transfer IP flow, the policy server initiates to the UE an IP flow transfer request. Additionally, according to the connection policies and the connection state of the current IP flow of the UE, the policy server judges whether to transfer back the transferred IP flow, so as to optimize bandwidth use and guarantee user's data service experience.

Obviously, the present invention may have other multiple embodiments, and those skilled in the art can make various corresponding alterations and changes according to the present invention within the spirit and essence of the present invention. All the corresponding alterations and changes should be included in the scope of the accompanying claims of the present invention.

Industrial Applicability

The present invention can guarantee that a user still can have uninterrupted data connection experience in the case that a certain network connection has congestion; and the use of the network bandwidth is optimized, and it is guaranteed that user's data service experience will not be obviously deteriorated when the network congestion occurs; and the different services can be timely transferred back to their original connections when the network congestion is relieved.

What is claimed is:

1. A method for guaranteeing data not to be interrupted in multi-network connection environment, applied between a user equipment (UE) connected with multiple networks and the multiple networks, comprising:
    when one or more network connections of the UE have congestion, transferring an IP flow of the UE to an uncongested network connection from the congested network connection(s),
    wherein that the one or more network connections of the UE have congestion is acquired by a policy server,
    when the policy server acquires that the one or more network connections of the UE has congestion, the step of transferring an IP flow of the UE to the uncongested network connection from the congested network connection(s) comprises:
    the policy server initiates to the UE an IP flow transfer request to indicate the UE to transfer an IP flow of a designated service from a network connection of a source network to a network connection of a target network, wherein the source network is a congested network and the target network is a uncongested network; and
    the UE transfers the IP flow of the designated service from the network connection(s) of the source network to the network connection of the target network;
    wherein the step of the policy server initiating to the UE an IP flow transfer request comprises:
    the policy server inquires a preset connection policy which is set based on network priority of a UE service, and according to the connection policy, selects as the designated service a service connected with the source network and required to be transferred, selects the target network, and initiates the IP flow transfer request to the UE.

2. The method according to claim 1, wherein the policy server acquires that the one or more network connections of the UE has congestion by receiving a congestion notification message of the source network.

3. The method according to claim 1, wherein the step of the UE transferring the IP flow of the designated service from the network connection(s) of the source network to the network connection of the target network comprises:
    the UE establishes a connection of the IP flow of the designated service with the target network; and
    the UE disconnects the connection of the IP flow of the designated service from the source network.

4. The method according to claim 3, wherein after the step of the UE disconnecting the connection of the IP flow of the designated service from the source network, the method further comprises:
    sending an IP flow transfer completion notification to the policy server; and
    recording by the policy server the connection state of the current IP flow of the UE.

5. The method according to claim 1, wherein, when acquiring that the source network is recovered to have normal network connection, the policy server inquires the preset connection policy, and initiates to the UE an IP flow transfer request according to the connection policy to indicate the UE to transfer the IP flow of the designated service from the target network back to a network connection of the source network; and the UE transfers the IP flow of the designated service back to the network connection of the source network.

6. The method according to claim 5, wherein the policy server acquires that the source network is recovered to have normal network connection by receiving a decongestion notification message of the source network.

7. The method according to claim 2, wherein, when acquiring that the source network is recovered to have normal network connection, the policy server inquires the preset connection policy, and initiates to the UE an IP flow transfer request according to the connection policy to indicate the UE to transfer the IP flow of the designated service from the target network back to a network connection of the source network; and the UE transfers the IP flow of the designated service back to the network connection of the source network.

8. The method according to claim 7, wherein the policy server acquires that the source network is recovered to have normal network connection by receiving a decongestion notification message of the source network.

9. The method according to claim 1, wherein,
when acquiring that the source network is recovered to have normal network connection, the policy server inquires the preset connection policy, and initiates to the UE an IP flow transfer request according to the connection policy to indicate the UE to transfer the IP flow of the designated service from the target network back to a network connection of the source network; and
the UE transfers the IP flow of the designated service back to the network connection of the source network.

10. The method according to claim 9, wherein the policy server acquires that the source network is recovered to have normal network connection by receiving a decongestion notification message of the source network.

11. The method according to claim 3, wherein, when acquiring that the source network is recovered to have normal network connection, the policy server inquires the preset connection policy, and initiates to the UE an IP flow transfer request according to the connection policy to indicate the UE to transfer the IP flow of the designated service from the target network back to a network connection of the source network; and the UE transfers the IP flow of the designated service back to the network connection of the source network.

12. The method according to claim 11, wherein the policy server acquires that the source network is recovered to have normal network connection by receiving a decongestion notification message of the source network.

13. The method according to claim 4, wherein, when acquiring that the source network is recovered to have normal network connection, the policy server inquires the preset connection policy, and initiates to the UE an IP flow transfer request according to the connection policy to indicate the UE to transfer the IP flow of the designated service from the target network back to a network connection of the source network; and the UE transfers the IP flow of the designated service back to the network connection of the source network.

14. The method according to claim 13, wherein
the policy server acquires that the source network is recovered to have normal network connection by receiving a decongestion notification message of the source network.

15. A system for guaranteeing data not to be interrupted in multi-network connection environment, comprising a UE connected with multiple networks, the multiple networks and a policy server, wherein the policy server is configured such that when acquiring one or more network connections of the UE has congestion, the policy server inquiries a preset connection policy which is set based on network priority of a UE service, and initiates to the UE an IP flow transfer request according to the connection policy to indicate the UE to transfer an IP flow of a designated service from a network connection of a source network to a network connection of a target network; and the UE is configured to transfer the IP flow of the designated service from the network connection of the source network to the network connection of the target network, wherein the source network is a congested network and the target network is an uncongested network which is selected according to the connection policy.

16. The system according to claim 15, wherein the policy server is further configured such that when acquiring the source network is recovered to have normal network connection, the policy server inquiries the preset connection policy, and initiates to the UE an IP flow transfer request according to the connection policy to indicate the UE to transfer the IP flow of the designated service from the target network back to a network connection of the source network; and the UE is further configured to transfer the IP flow of the designated service back to the network connection of the source network.

17. A policy server for guaranteeing data not to be interrupted in multi-network connection environment, wherein the policy server is configured such that:
when acquiring one or more network connections of a UE has congestion, the policy server inquiries a preset connection policy which is set based on network priority of a UE service, and initiates to the UE an IP flow transfer request according to the connection policy to indicate the UE to transfer an IP flow of a designated service from a network connection of a source network to a network connection of an target network; and the UE can thereby transfer the IP flow of the designated service from the network connection of the source network to the network connection of the target network, wherein the source network is a congested network and the target network is an uncongested network which is selected according to the connection policy.

18. The policy server according to claim 17, wherein the policy server is further configured such that when acquiring the source network is recovered to have normal network connection, the policy server inquiries the preset connection policy, and initiates to the UE an IP flow transfer request according to the connection policy to indicate the UE to transfer the IP flow of the designated service from the target network back to a network connection of the source network; and the UE can thereby transfer the IP flow of the designated service back to the network connection of the source network.

* * * * *